UNITED STATES PATENT OFFICE.

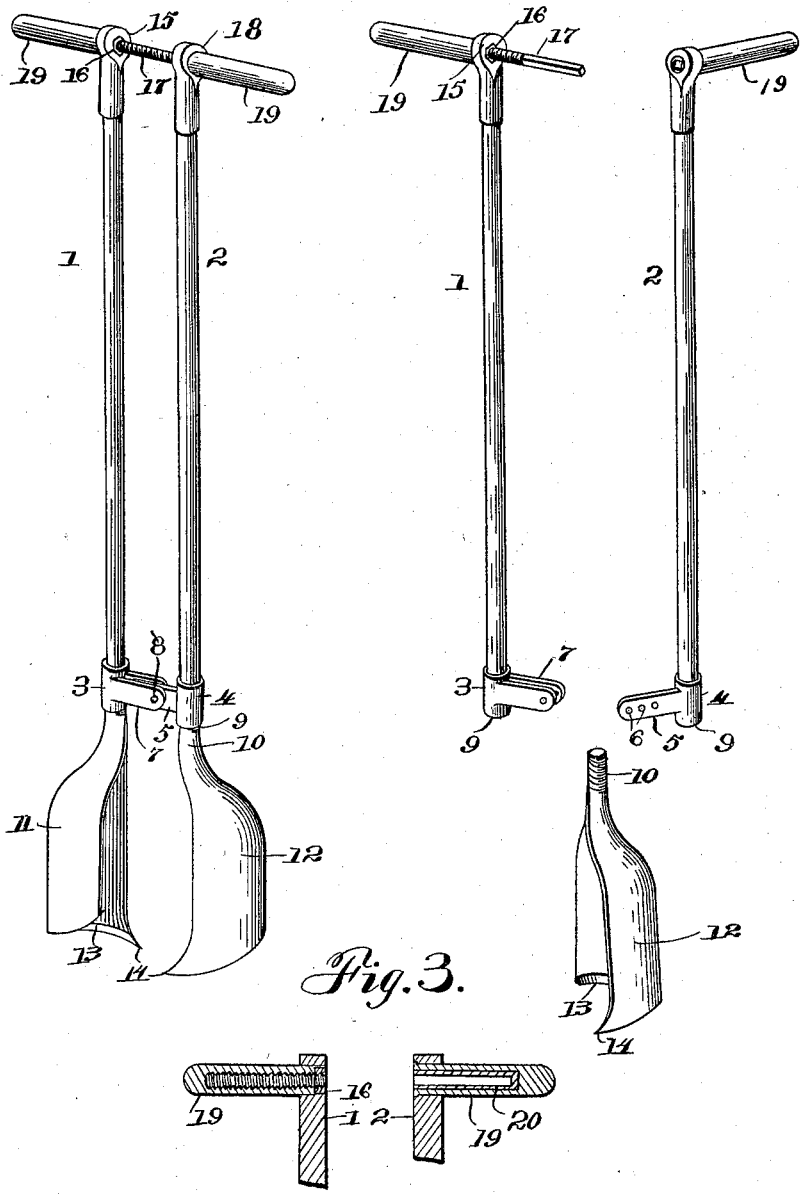

JAMES EVANS, OF DAVID CITY, NEBRASKA.

POST-AUGER.

SPECIFICATION forming part of Letters Patent No. 605,411, dated June 7, 1898.

Application filed June 18, 1897. Serial No. 641,214. (No model.)

*To all whom it may concern:*

Be it known that I, JAMES EVANS, of David City, in the county of Butler and State of Nebraska, have invented certain new and useful Improvements in Post-Augers; and I do hereby declare the following to be a full, clear, and exact description of the invention, such as will enable others skilled in the art to which it appertains to make and use the same.

This invention relates to post-hole augers; and it consists, essentially, of two movable sections or members pivotally connected to each other and carrying at their lower ends specific forms of shells or cutting-heads.

The invention further consists of the details of construction and arrangement of the several parts, which will be more fully hereinafter described and claimed.

The object of the invention is to simplify this class of devices and so construct them that they will have a positive action in forming post-holes, the several parts being adjustable, strong, and durable and comparatively inexpensive in the cost of manufacture and sale.

In the accompanying drawings, Figure 1 is a perspective view of a post-hole auger embodying the invention. Fig. 2 is a similar view of parts of the device shown disconnected. Fig. 3 is a sectional view on the line x x of Fig. 1.

Referring to the drawings, wherein similar numerals of reference are employed to indicate corresponding parts in the several views, the numerals 1 and 2 designate handles constructed of suitable material and having at their lower ends screw-sleeves 3 and 4, the sleeve 4 having a tongue 5 extending inwardly therefrom and provided with a series of apertures 6. The sleeve 3 is formed with inwardly-extending arms 7, which are spaced apart and adapted to receive and embrace the tongue 5 in an adjustable manner through the medium of a pivot-pin 8, passed through openings in the outer ends of the arms 7 and engaging either one of the apertures 6. The lower portions of each of the sleeves 3 and 4 are formed with screw-threaded sockets 9 to receive the upper reduced screw-threaded shanks 10 of oppositely-disposed cutting-shells 11 and 12. These shells or heads 11 and 12 are approximately semicylindrical in form, and each is provided with a spiral cutting-flange 13 on the inner lower portion thereof, with a point 14 projecting from opposite inner sides to cause the said shells or heads to be drawn downwardly in the ground when the handles 1 and 2 are unitedly revolved. The handle 1 has a slightly-flattened upper end 15, with an opening therethrough, in which is seated a nut 16, and is adapted to receive a screw-rod 17, carried in the opposite similarly-constructed end 18 of the handle 2, and over these parts are secured outwardly-projecting handles or grips 19, constructed of wood or analogous material. In securing these handles 18 in position means are also provided for operating the screw-rod 17, and the handle 19 engages a sleeve 20, projecting outwardly from the adjacent head 18 and in which the end of the said screw-rod is secured, while the opposite end of the said screw-rod projects into a hollow portion of the handle 19, in connection with the end 15. That portion of the screw-rod 17 which enters the sleeve 20 is made angular to insure a proper fastening, and the sleeve 20 has movement in the end 18, whereby when the adjacent handle 19 is turned the screw-rod is released from the opposite head and handle and the shells or heads 11 and 12 can be moved inwardly on the hinge-joint or fulcrum formed by the tongue 5 and the arms 7. This spreading operation of the upper ends of the handles 1 and 2 will ensue when it is desired to loosen the earth between the shells 11 and 12 in the operation of boring. The parts may be adjusted so that the shells or heads 11 and 12 may be arranged to form an opening or hole of a larger diameter by releasing the pivot-pin 8 and positioning it in another of the apertures 6 in the tongue 5. The parts as arranged in Fig. 1 are reduced to their smallest diametrical extent, because the tongue 5 is fully embraced by the arms 7. At the time when the handles are spread apart to loosen the earth in a hole being bored the removal of the said shells or heads can be readily accomplished.

The parts generally are very efficient in their construction and operation, and it is obviously apparent that many minor changes in the details of construction might be made and substituted for those shown and described without in the least departing from the nature or spirit of the invention.

Having thus described the invention, what is claimed as new is—

1. The combination with the handles and screw-sleeves at their lower ends having lateral arms, and an adjustable pivot connecting them, of shells having screw-threaded shanks engaging sockets in said sleeves, and means adjustably connecting the opposite ends of said handles, as set forth.

2. The combination with the handles pivoted together near their lower ends and the shells carried by said handles, of hollow handles projecting laterally from the upper ends of the handles one of which is interiorly threaded, a sleeve movably mounted in the other handle and a screw-rod entering said sleeve at one end and the other end engaging the threads of the other handle, substantially as specified.

3. The combination with the handles pivoted together at their lower ends and the shells carried thereby, of hollow grip-handles projecting laterally from the upper ends of the handles and one of which is interiorly threaded a nut held in the inner end thereof, a sleeve movably mounted in the other handle and a screw-rod entering the sleeve at one end and the other end engaging said nut and the threads of the other grip-handle, all substantially as shown and described.

In testimony whereof I have signed this specification in the presence of two subscribing witnesses.

JAMES EVANS.

Witnesses:
LOUIS STRAKA,
GEO. DEAN.